(12) United States Patent
Su et al.

(10) Patent No.: US 11,435,613 B2
(45) Date of Patent: Sep. 6, 2022

(54) DISPLAY APPARATUS

(71) Applicant: Qisda Corporation, Taoyuan (TW)

(72) Inventors: Chih-Chieh Su, Taoyuan (TW);
Chen-Yang Hu, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 17/362,097

(22) Filed: Jun. 29, 2021

(65) Prior Publication Data

US 2022/0011628 A1 Jan. 13, 2022

(30) Foreign Application Priority Data

Jul. 7, 2020 (CN) .......................... 202010648328.X

(51) Int. Cl.
*G02F 1/1335* (2006.01)
*G02F 1/13357* (2006.01)
*G09G 3/34* (2006.01)

(52) U.S. Cl.
CPC .. *G02F 1/133514* (2013.01); *G02F 1/133609* (2013.01); *G02F 1/133611* (2013.01); *G09G 3/3413* (2013.01)

(58) Field of Classification Search
CPC ......... G02F 1/133514; G02F 1/133609; G02F 1/133611; G09G 3/3413
USPC .................................................. 349/106–109
See application file for complete search history.

(56) References Cited

U.S. PATENT DOCUMENTS

2017/0365225 A1\* 12/2017 Yoneyama ........ G02F 1/134309
2018/0252963 A1\* 9/2018 Kim .................. G02F 1/133602

\* cited by examiner

*Primary Examiner* — Charles S Chang

(57) ABSTRACT

A display apparatus is disclosed. The display apparatus includes a color filter, a first backlight unit, a second backlight unit and a third backlight unit. The first backlight unit, the second backlight unit and the third backlight unit are disposed relative to the color filter and independently emit a first color light, a second color light and a third color light to the color filter respectively. In a brightness mode, the first color light has a first intensity, the second color light has a second intensity and the third color light has a third intensity. In a color mode, when a display image of the display apparatus is biased to a third color corresponding to the third color light, the display apparatus reduces at least one of the first intensity and the second intensity.

16 Claims, 16 Drawing Sheets

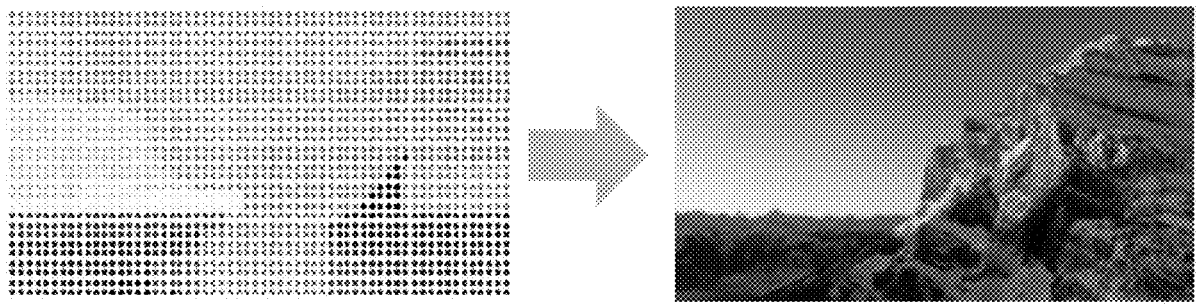
FIG. 12A                    FIG. 12B

DISPLAY APPARATUS

BACKGROUND OF THE INVENTION

1. Field of the Invention

The invention relates to a display apparatus; in particular, to a display apparatus capable of effectively enhancing display image quality.

2. Description of the Prior Art

In general, a backlight module emitting white light is usually used in a conventional liquid crystal display, and color filters of red, green and blue are used to filter out remaining unwanted spectrums to display images of red, green and blue respectively.

However, in practical applications, because the above-mentioned color filters still fail to completely separate the lights of red, green and blue, the conventional liquid crystal display will still leak some green light when displaying a blue image (as shown in FIG. 1A) and leaks some blue light and red light (as shown in FIG. 1B) when displaying a green image. As a result, the color saturation of its display image is poor, and the quality of its display image is seriously affected. This shortcoming needs to be improved.

SUMMARY OF THE INVENTION

Therefore, the invention provides a display apparatus to solve the above-mentioned problems of the prior arts.

An embodiment of the invention is a display apparatus. In this embodiment, the display apparatus includes a color filter, a first backlight unit, a second backlight unit and a third backlight unit. The first backlight unit, the second backlight unit and the third backlight unit are disposed relative to the color filter and configured to independently emit a first color light, a second color light and a third color light to the color filter respectively. In a brightness mode, the first color light has a first intensity, the second color light has a second intensity, and the third color light has a third intensity; in a color mode, when a display image of the display apparatus is biased to a third color corresponding to the third color light, the display apparatus reduces at least one of the first intensity and the second intensity.

In an embodiment, the third color light is blue light, and the first color light and the second color light are red light and green light respectively; in the brightness mode, the first color light, the second color light and the third color light are mixed into white light before entering the color filter.

In an embodiment, in the color mode, when the display image is biased to a second color corresponding to the second color light, the display apparatus reduces at least one of the first intensity and the third intensity.

In an embodiment, the first color light, the second color light and the third color light are red light, green light and blue light respectively; in the brightness mode, the first color light, the second color light and the third color light are mixed into white light before entering the color filter.

In an embodiment, a first display area and a second display area of the display image correspond to the color mode and the brightness mode respectively.

In an embodiment, the display apparatus further includes a fourth backlight unit. The fourth backlight unit is disposed relative to the color filter and independently controlled. The fourth backlight unit is configured to emit a fourth color light to make the second display area to display a mixed light of the first color light, the second color light, the third color light and the fourth color light.

In an embodiment, when a first display image change occurs in the first display area, the first backlight unit, the second backlight unit and the third backlight unit correspondingly adjust at least one of the first color light, the second color light and the third color light emitted by the first backlight unit, the second backlight unit and the third backlight unit according to a first dimming mode.

In an embodiment, when a second display image change occurs in the second display area, the first backlight unit, the second backlight unit and the third backlight unit correspondingly adjust at least one of the first color light, the second color light and the third color light emitted by the first backlight unit, the second backlight unit and the third backlight unit according to a second dimming mode.

In an embodiment, the color filter includes a first filtering area, a second filtering area and a third filtering area corresponding to the first backlight unit, the second backlight unit and the third backlight unit respectively and configured to perform filtering on the first color light, the second color light and the third color light respectively.

In an embodiment, the color filter includes a color filter layer, the color filter layer includes a first filtering area, a second filtering area and a third filtering area, and sizes of the first backlight unit, the second backlight unit and the third backlight unit are larger than sizes of the first filtering area, the second filtering area and the third filtering area.

In an embodiment, the color filter includes a liquid crystal layer and a color filtering layer, the liquid crystal layer includes a first liquid crystal area, a second liquid crystal area and a third liquid crystal area, and the color filtering layer includes a first filtering area, a second filtering area and a third filtering area corresponding to the first liquid crystal area, the second liquid crystal area and the third liquid crystal respectively; when the display image is biased to the third color, the third intensity is greater than the first intensity and the second intensity, and a rotating angle of the third liquid crystal area is greater than that of the first liquid crystal area and that of the second liquid crystal area; the rotation angles of the first liquid crystal area, the second liquid crystal area and the third liquid crystal area are adjusted according to a condition of the display image to determine the color of the display image.

Another embodiment of the invention is a display apparatus. In this embodiment, the display apparatus includes a color filter, a first backlight unit, a second backlight unit and a third backlight unit. The color filter is disposed corresponding to a display area of the display apparatus. The first backlight unit, the second backlight unit and the third backlight unit are disposed relative to the color filter and configured to independently emit a first color light, a second color light and a third color light to the color filter respectively. When a first display image change occurs in the display area, the first backlight unit, the second backlight unit and the third backlight unit correspondingly adjust at least one of the first color light, the second color light and the third color light emitted by the first backlight unit, the second backlight unit and the third backlight unit according to a first dimming mode. When the first display image change is to increase brightness of the display image, the first dimming mode also reduces chromaticness of at least one of the first color light, the second color light and the third color light. When the first display image change is to reduce brightness of the display image, the first dimming mode also increases chromaticness of at least one of the first color light, the second color light and the third color light.

In an embodiment, the first dimming mode corresponds to the first display image change and is used for adjusting chromaticness of at least one of the first color light, the second color light and the third color light.

In an embodiment, when a second display image change occurs in the display area, the first backlight unit, the second backlight unit and the third backlight unit correspondingly adjust at least one of the first color light, the second color light and the third color light emitted by the first backlight unit, the second backlight unit and the third backlight unit according to a second dimming mode.

In an embodiment, the second dimming mode corresponds to the second display image change and is used for adjusting chromaticness of at least one of the first color light, the second color light and the third color light.

In an embodiment, the display apparatus includes a fourth backlight unit disposed relative to the color filter and independently controlled and configured to emit a fourth color light. When the first display image change occurs in the display area, the fourth backlight unit selectively adjusts the fourth color light emitted by the fourth backlight unit according to the first dimming mode.

In an embodiment, the first dimming mode corresponds to the first display image change and is used for adjusting brightness of the fourth color light.

In an embodiment, the color filter includes a first filtering area, a second filtering area and a third filtering area corresponding to the first backlight unit, the second backlight unit and the third backlight unit respectively and used to perform filtering on the first color light, the second color light and the third color light respectively.

Compared to the prior art, the display apparatus of the invention has following advantages/effects:

(1) the display apparatus of the invention can use red, green and blue light-emitting diode (LED) backlight units to emit lights independently and cooperate with local dimming to improve color saturation of its display image;

(2) since the luminous efficiency of red and green LED backlight units is generally poor, the display apparatus of the invention can also add a LED backlight unit emitting white light to mix with red, green and blue lights, which can increase the intensity of white light in a brightness mode to enhance the brightness of its display image, and reduce the intensity of white light in a color mode to increase the color saturation of its display image; and (3) in the color mode, when the color of the display image is biased to the blue color, the display apparatus of the invention will reduce the luminous intensity of the red LED backlight unit and/or the green LED backlight unit; when the color of the display image is biased to the green color, the display apparatus of the invention will reduce the luminous intensity of the red LED backlight unit and/or the blue LED backlight unit to increase the color saturation of its display image.

The advantage and spirit of the invention may be understood by the following detailed descriptions together with the appended drawings.

BRIEF DESCRIPTION OF THE APPENDED DRAWINGS

FIG. 12A and FIG. 12B illustrate schematic diagrams showing that the original display image with poor color saturation can be significantly improved after being dimmed by the display apparatus of the invention.

DETAILED DESCRIPTION OF THE INVENTION

Figure 1A:
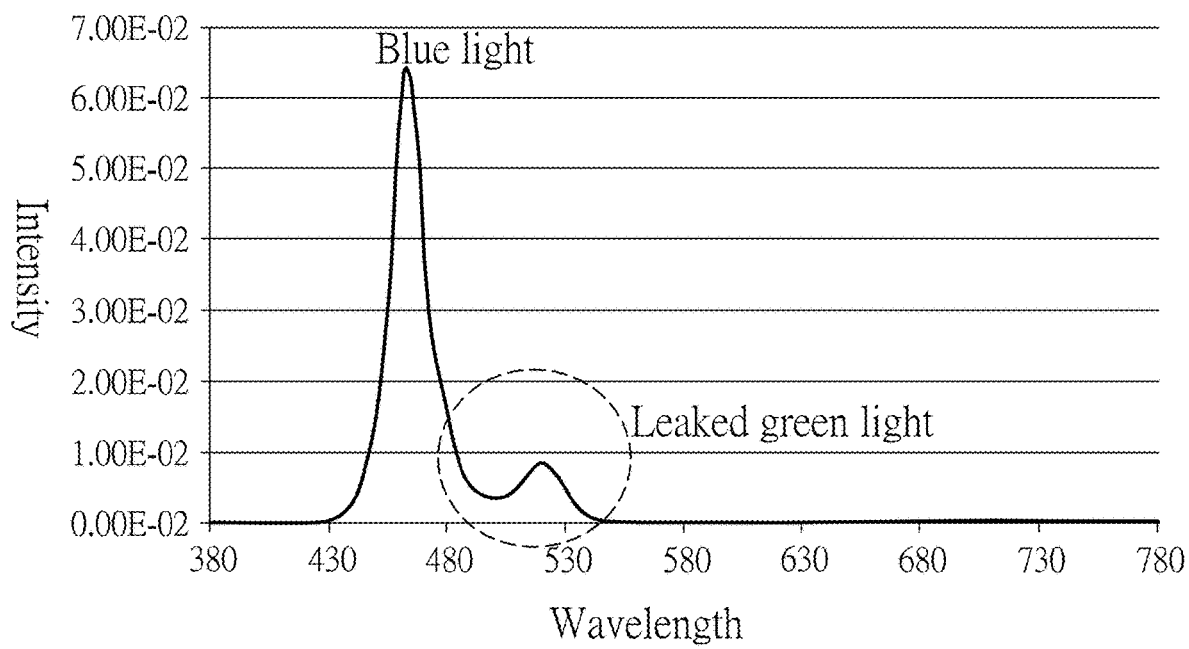
FIG. 1A and FIG. 1B illustrate schematic diagrams showing that some green light is still leaked when a conventional liquid crystal display displays a blue image and some blue light and red light are still leaked when a green image is displayed respectively.

Reference will now be made in detail to exemplary embodiments of the present invention, and examples of the exemplary embodiments are illustrated in the accompanying drawings. Elements/components with the same or similar numbers used in the drawings and embodiments are used to represent the same or similar parts.

Figure 2A:
FIG. 2A illustrates a schematic diagram of a display apparatus including a color filter and a first backlight unit to a third backlight unit independently emitting lights respectively in an embodiment of the invention.

A preferred embodiment of the invention is a display apparatus. Please refer to FIG. 2A. FIG. 2A illustrates a schematic diagram of a display apparatus in this embodiment.

As shown in FIG. 2A, the display apparatus DP includes a color filter CF, a first backlight unit R, a second backlight unit G and a third backlight unit B. The first backlight unit R, the second backlight unit G and the third backlight unit B are disposed relative to the color filter CF. The color filter CF includes a first filtering area CF1, a second filtering area CF2 and a third filtering area CF3 corresponding to the first backlight unit R, the second backlight unit G and the third backlight unit B respectively. The first backlight unit R, the second backlight unit G and the third backlight unit B are independently controlled respectively. In other words, the first backlight unit R, the second backlight unit G and the third backlight unit B emit light independently, and there is no correlation between them.

It should be noted that in practical applications, the color filter CF can also include a thin-film transistor layer and a liquid crystal layer, and the sizes of the first backlight unit R, the second backlight unit G and the third backlight unit B can be larger than the sizes of the first filtering area R1, the second filtering area G1 and the third filtering area B1 in a single pixel; that is to say, the sizes of the first backlight unit R, the second backlight unit G and the third backlight unit B can be non-pixel level, but not limited to this. Since the details will be explained later, they will not be repeated here.

Figure 2B:
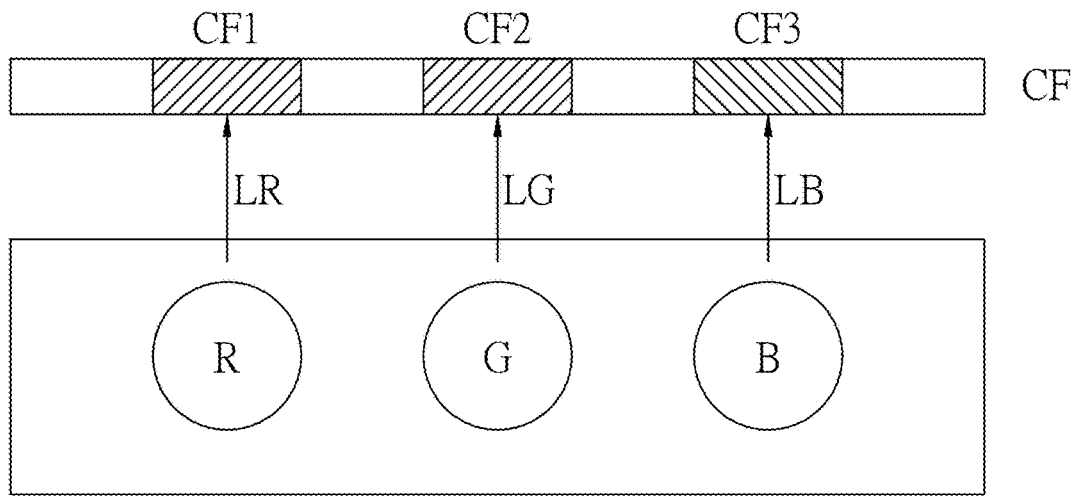
FIG. 2B illustrates a schematic diagram of the first backlight unit to the third backlight unit in the display apparatus emitting lights simultaneously.

As shown in FIG. 2B, when the first backlight unit R, the second backlight unit G and the third backlight unit B emit the first color light LR, the second color light LG and the third color light LB to the first filtering area CF1, the second filtering area CF2 and the third filtering area CF3 of the color filter CF respectively, the first filtering area CF1, the second filtering area CF2 and the third filtering area CF3 will perform filtering on the first color light LR, the second color light LG and the third color light LB respectively to filter out the remaining unnecessary spectrum and then they are provided to the display panel.

For example, the first backlight unit R, the second backlight unit G and the third backlight unit B can be a red light-emitting diode (LED) backlight unit, a green LED backlight unit and a blue LED backlight unit respectively. That is to say, the first color light LR, the second color light LG and the third color light LB emitted by the first backlight unit R, the second backlight unit G, and the third backlight unit B are red light, green light and blue light respectively, and the first filtering area CF1, the second filtering area CF2 and the third filtering area CF3 of the color-filter CF are a red light filtering area, a green light filtering area and a blue light filtering area respectively, which are used to perform filtering on the first color light LR (i.e., the red light), the second color light LG (i.e., the green light) and the third color light LB (i.e., the blue light) respectively to filter out the remaining unnecessary spectrum and then they are provided to the display panel, but not limited to this.

In practical applications, the display apparatus DP can be operated in a brightness mode or a color mode. In the brightness mode, it is assumed that the first color light LR, the second color light LG and the third color light LB emitted by the first backlight unit R, the second backlight unit G and the third backlight unit B have the first intensity, the second intensity and the third intensity respectively (for example, the arrows corresponding to the first color light LR, the second color light LG and the third color light LB in FIG. 2B respectively).

In the color mode, when the display image of the display apparatus DP is biased to the third color (i.e., blue) corresponding to the third color light LB, the display apparatus DP will reduce at least one of a first intensity of the first color light LR (i.e., the red light) emitted by the first backlight unit R and a second intensity of the second color light LG (i.e., the green light) emitted by the second backlight unit G.

Figure 3A:
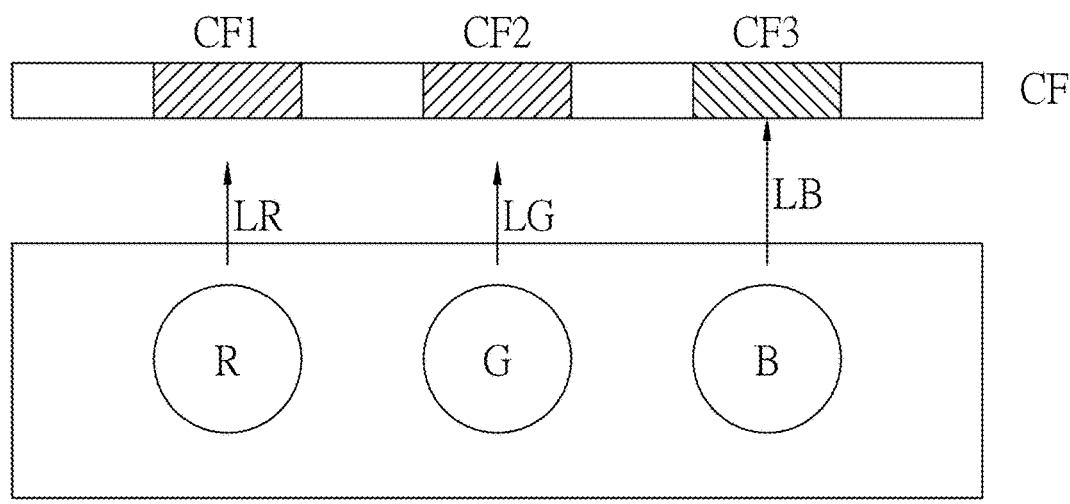
FIG. 3A illustrates a schematic diagram of reducing the first intensity of the first color light emitted by the first backlight unit and the second intensity of the second color light emitted by the second backlight unit simultaneously.

For example, the display apparatus DP can reduce the first intensity of the first color light LR (i.e., the red light) emitted by the first backlight unit R and the second intensity of the second color light LG (i.e., the green light) emitted by the second backlight unit G simultaneously, for example, as shown by the shortened arrows corresponding to the first color light LR (i.e., the red light) and the second color light LG (i.e., the green light) in FIG. 3A.

Figure 3B:
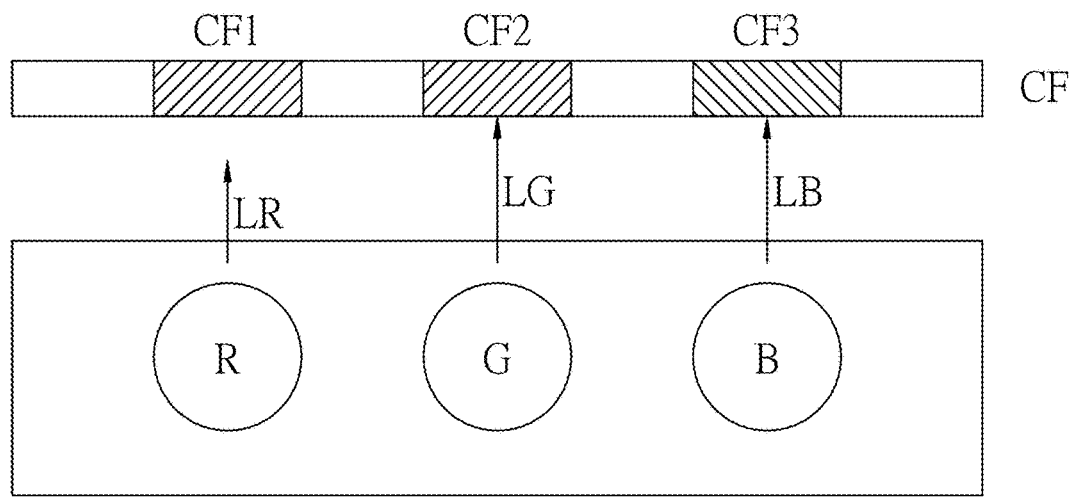
FIG. 3B illustrates a schematic diagram of only reducing the first intensity of the first color light emitted by the first backlight unit.
Figure 3C:
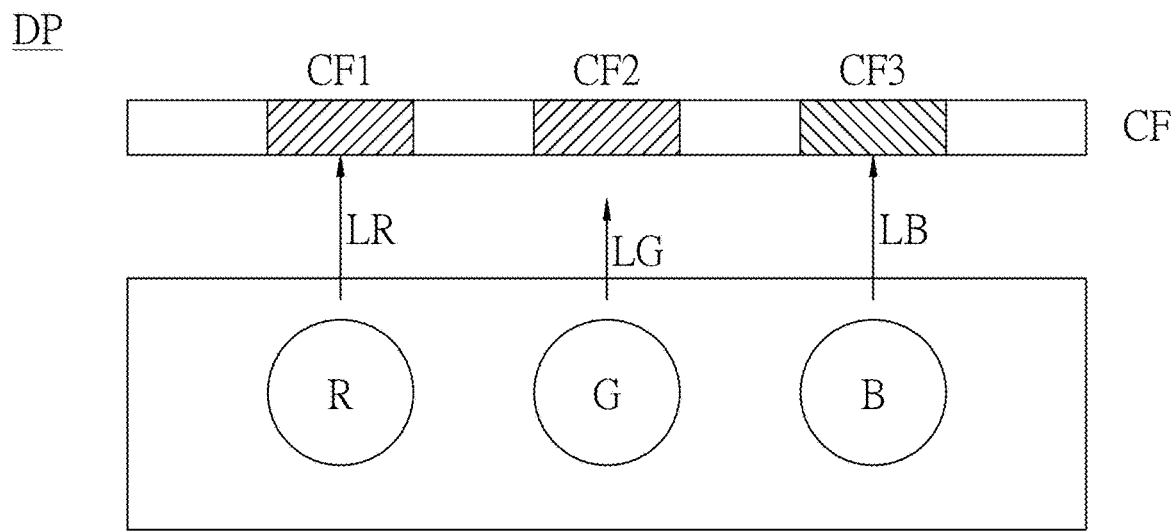
FIG. 3C illustrates a schematic diagram of only reducing the second intensity of the second color light emitted by the second backlight unit.

In addition, the display apparatus DP can also only reduce the first intensity of the first color light LR (i.e., the red light) emitted by the first backlight unit R, for example, as shown in FIG. 3B, the arrow corresponding to the first color light LR (i.e., the red light) is shortened, or the display apparatus DP can only reduce the second intensity of the second color light LG (i.e., the green light) emitted by the second backlight unit G, for example, as shown in FIG. 3C, the arrow corresponding to the second color light LG (i.e., the green light) is also shortened.

Figure 3D:
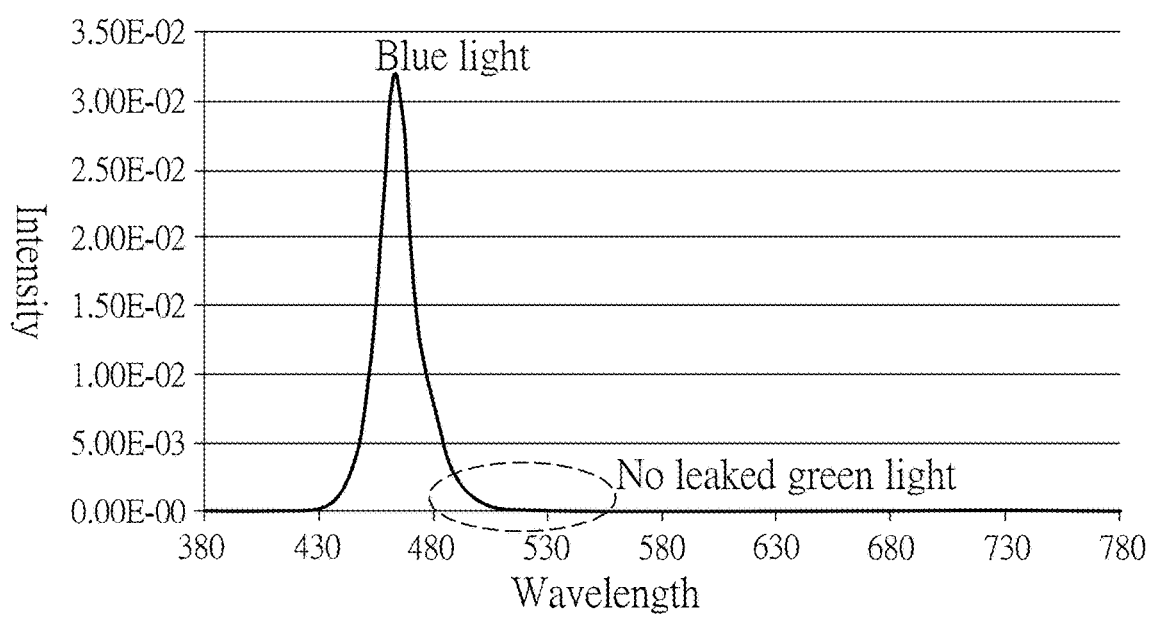
FIG. 3D illustrates a schematic diagram showing that no green light is leaked when the display apparatus of the invention displays a blue image.

It should be noted that the above-mentioned method of reducing the intensity of the red light emitted by the first backlight unit R and/or the intensity of the green light emitted by the second backlight unit G, as shown in FIG. 3D, when the display apparatus of the invention displays a blue image, the green light will not be leaked out as shown in FIG. 1A, so the color saturation of the display image can be effectively improved.

Similarly, in the color mode, when the display image of the display apparatus is biased to the second color (i.e., green) corresponding to the second color light LG, the display apparatus DP will reduce at least one of the first intensity of the first color light LR (i.e., the red light) emitted by the first backlight unit R and the third intensity of the third color light LB (i.e., the blue light) emitted by the third backlight unit B.

Figure 4A:
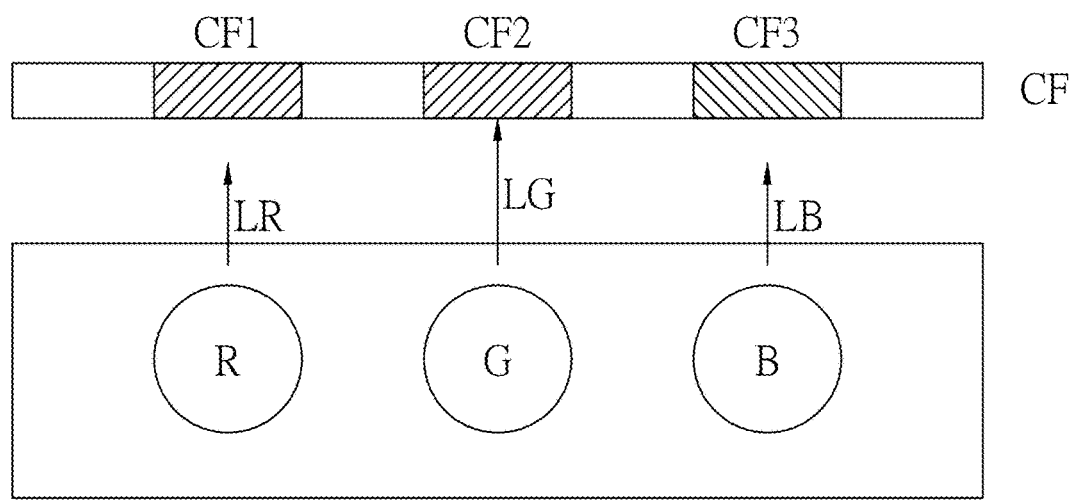
FIG. 4A illustrates a schematic diagram of reducing the first intensity of the first color light emitted by the first backlight unit and the third intensity of the third color light emitted by the third backlight unit simultaneously.

For example, the display apparatus DP can reduce the first intensity of the first color light LR (i.e., the red light) emitted by the first backlight unit R and the third intensity of the third color light LB (i.e., the blue light) emitted by the third backlight unit B simultaneously, for example, as shown in FIG. 4A, the arrows corresponding to the first color light LR (i.e., the red light) and the third color light LB (i.e., the blue light) are shortened.

Figure 4B:
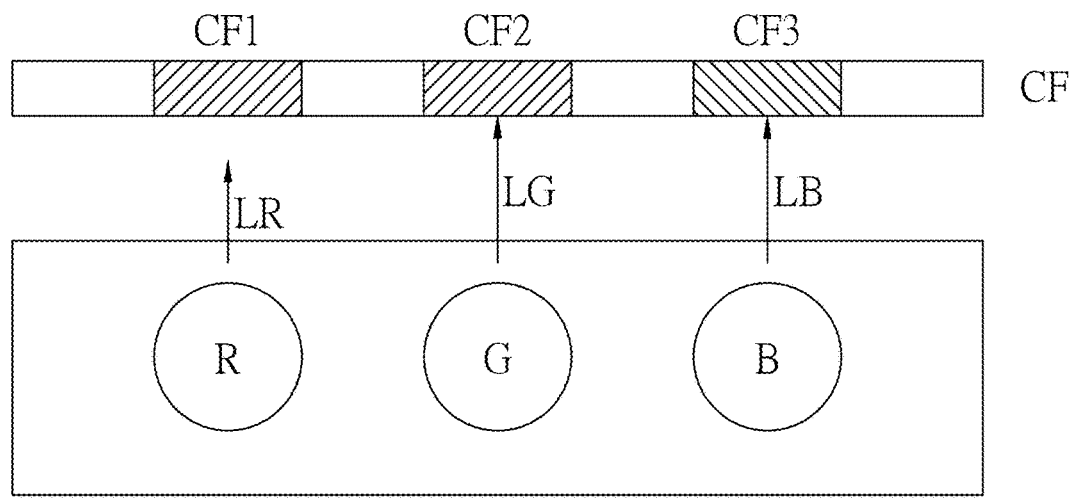
FIG. 4B illustrates a schematic diagram of only reducing the first intensity of the first color light emitted by the first backlight unit.
Figure 4C:
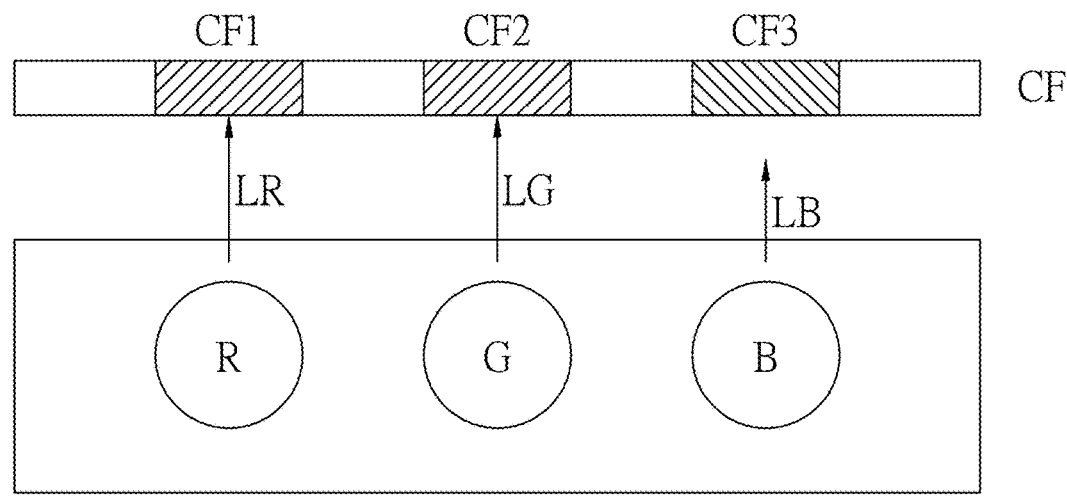
FIG. 4C illustrates a schematic diagram of only reducing the third intensity of the third color light emitted by the third backlight unit.

In addition, the display apparatus DP can also only reduce the first intensity of the first color light LR (i.e., the red light) emitted by the first backlight unit R, for example, as shown in FIG. 4B, the arrow corresponding to the first color light LR (i.e., the red light) is shortened, or the display apparatus DP can only reduce the third intensity of the third color light LB (i.e., the blue light) emitted by the third backlight unit B, for example, as shown in FIG. 4C, the arrow corresponding to the third color light LB (i.e., the blue light) is shortened.

Figure 1B:
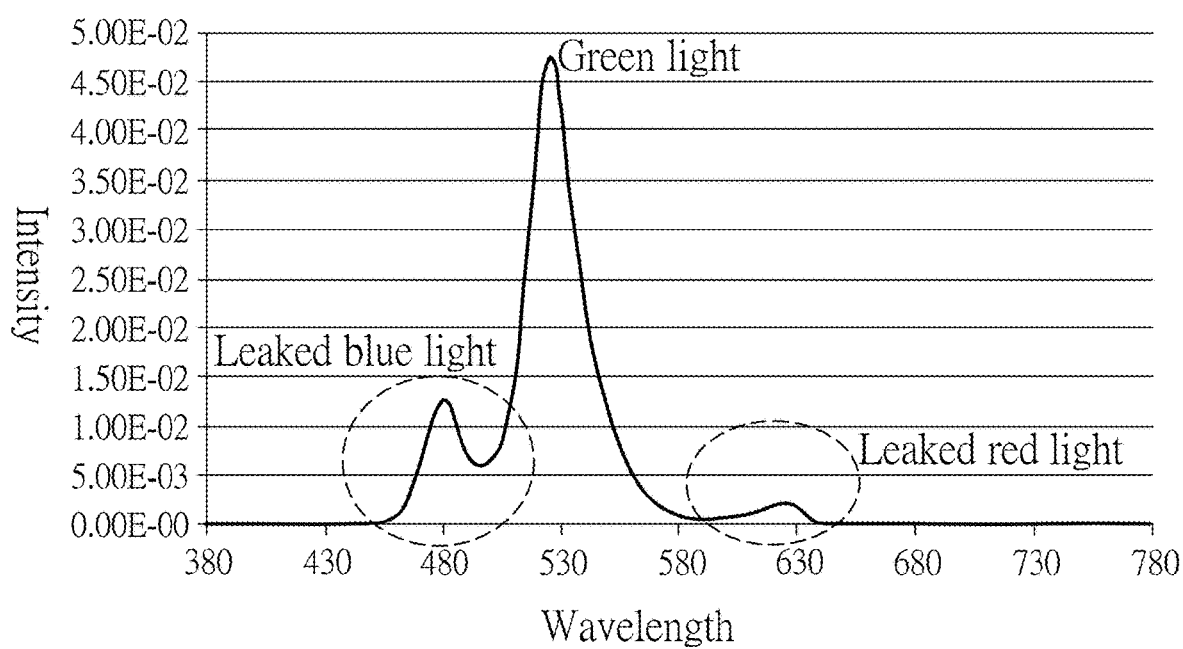
Figure 4D:
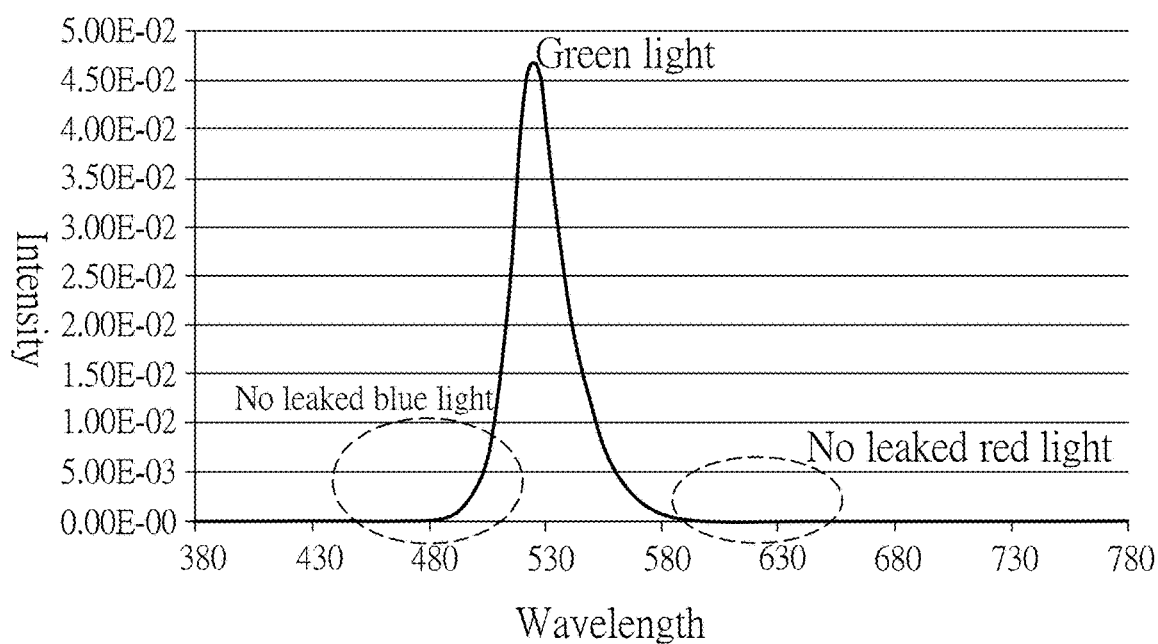
FIG. 4D illustrates a schematic diagram showing that no red light and blue light is leaked when the display apparatus of the invention displays a green image.

It should be noted that through the above-mentioned method of reducing the intensity of red light emitted by the first backlight unit R and/or the intensity of blue light emitted by the third backlight unit B, as shown in FIG. 4D, when the display apparatus of the invention displays a green image, the red light and the blue light will not be leaked as shown in FIG. 1B, so the color saturation of the display image can be effectively improved.

Figure 5:
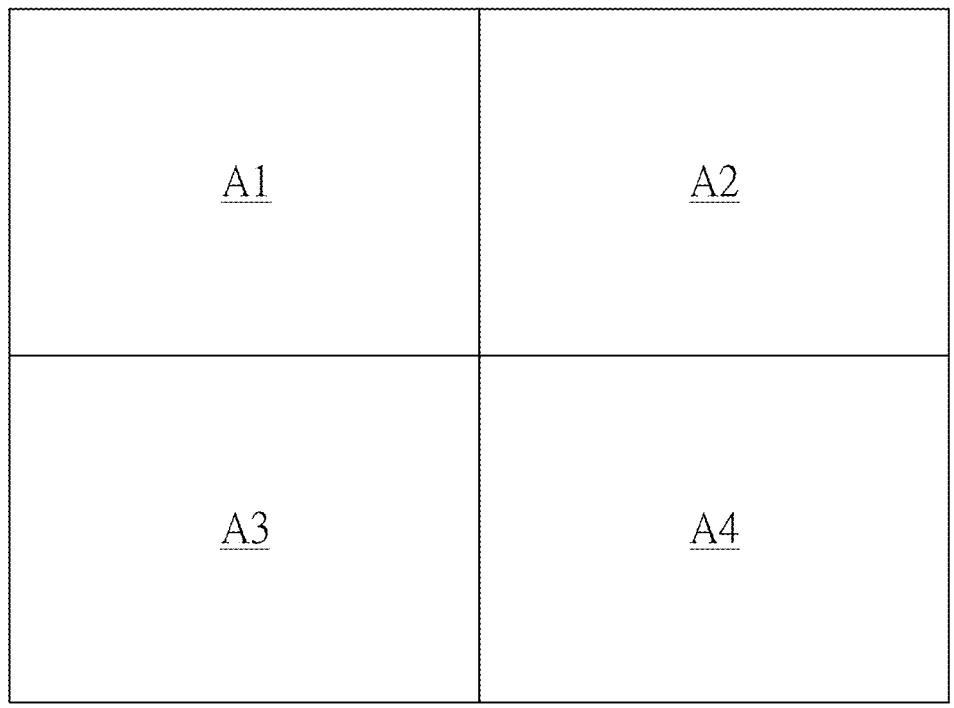
FIG. 5 illustrates a schematic diagram showing that the display image of the display apparatus of the invention includes a plurality of display areas.

In practical applications, the display image of the display apparatus can include a plurality of display areas, and different display areas can correspond to the same display mode or different display modes depending on actual needs. For example, as shown in FIG. 5, the display image DA includes a first display area A1 to a fourth display area A4, wherein the first display area A1 and the second display area A2 can correspond to the color mode and the brightness mode respectively, but not limited to this.

Figure 6A:
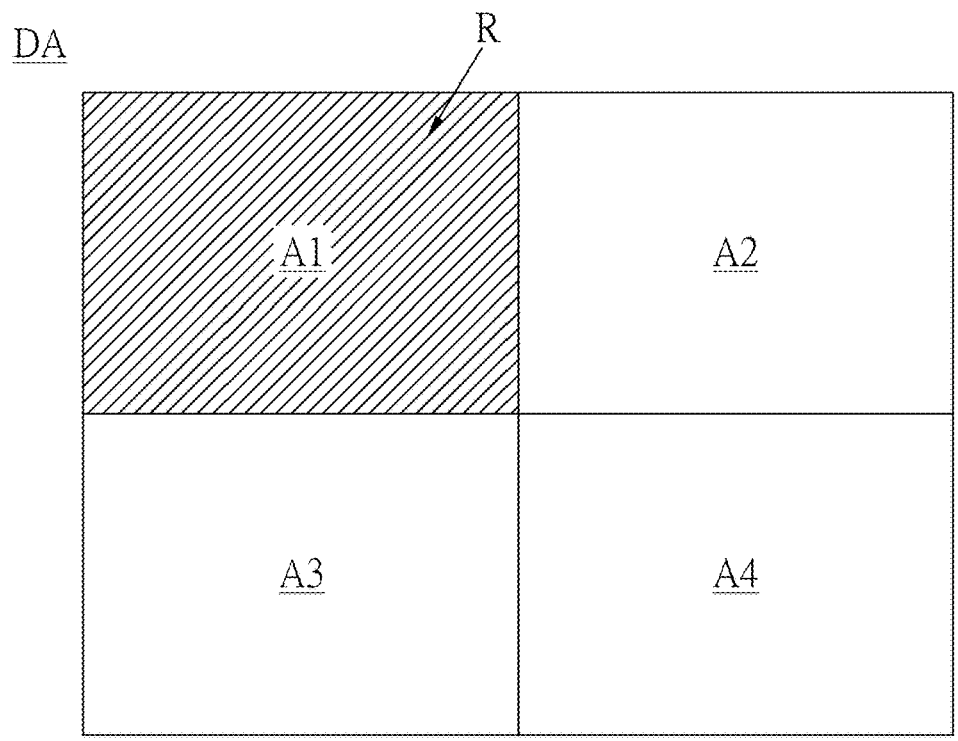
FIG. 6A illustrates a schematic diagram showing that a red image is displayed in the first display area of the display image.
Figure 6B:
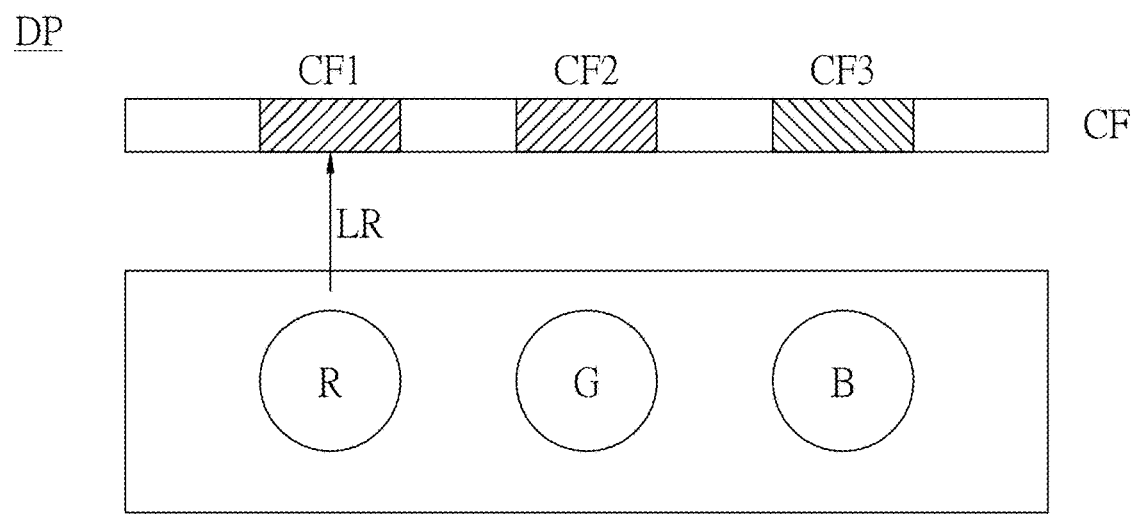
FIG. 6B illustrates a schematic diagram showing that only the first backlight unit of the display apparatus independently emits red light.

In one embodiment, as shown in FIG. 6A and FIG. 6B, in the color mode, when the first display area A1 of the display image displays the red color (R), only the first backlight unit R corresponding to the red color independently emits the first color light LR (i.e., the red light) to the first filtering area CF1 of the color filter CF (that is to say, the second backlight unit G corresponding to the green color and the third backlight unit B corresponding to the blue color do not emit lights), and then the first color light LR (i.e., the red light) passes through the first filtering area CF1 to filter out the spectrum other than the red light and then it is provided to the display panel, so as to effectively improve the color saturation when the first display area A1 of the display image displays the red color. In fact, the second backlight unit G can also emit the second color light LG (i.e., the green light) and/or the third backlight unit B can also emit the third color light LB (i.e., the blue light), and there is no specific limitation.

Figure 7A:
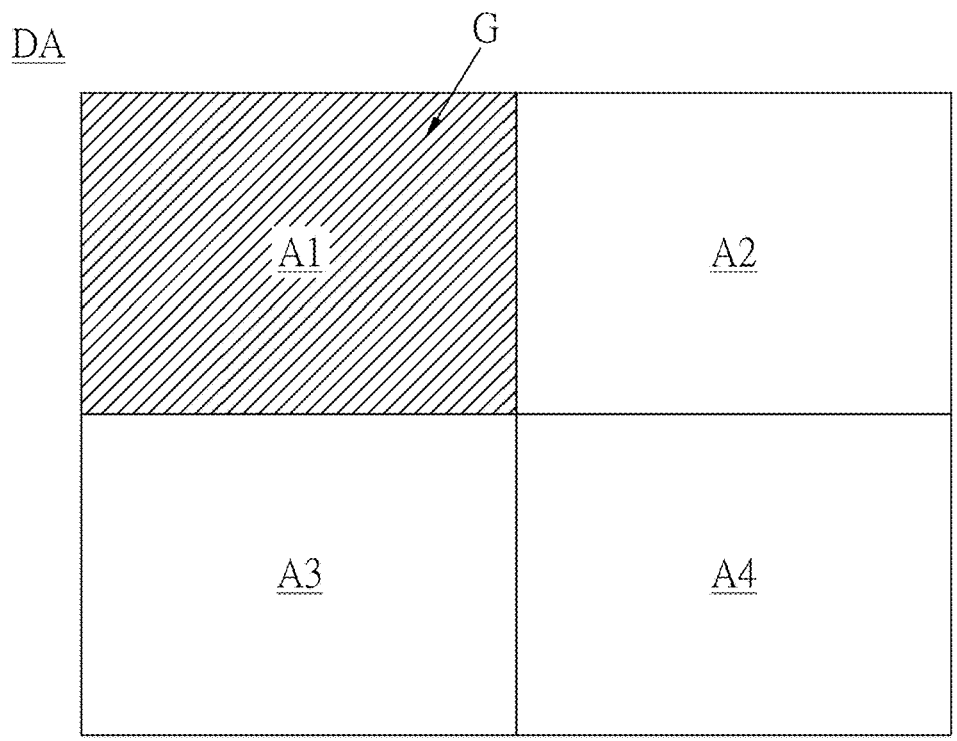
FIG. 7A illustrates a schematic diagram showing that a green image is displayed in the first display area of the display image.
Figure 7B:
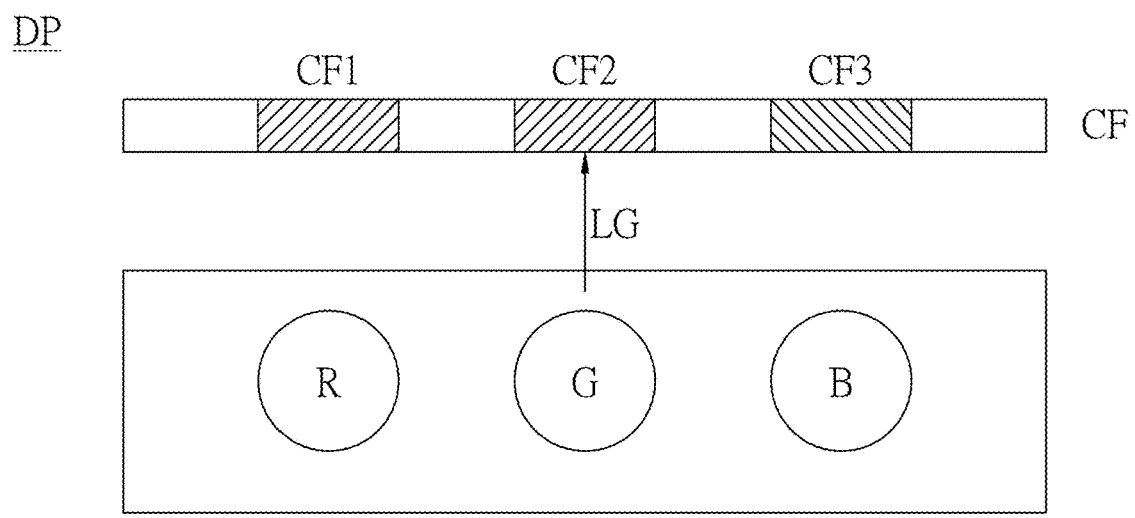
FIG. 7B illustrates a schematic diagram showing that only the second backlight unit of the display apparatus independently emits green light.

In another embodiment, as shown in FIG. 7A and FIG. 7B, in the color mode, when the first display area A1 of the display image displays the green color (G), only the second backlight unit G corresponding to the green color independently emits the second color light LG (i.e., the green light) to the second filtering area CF2 of the color filter CF (that is to say, the first backlight unit R corresponding to the red color and the third backlight unit B corresponding to the blue color do not emit lights), and then the second color light LG (i.e., the green light) passes through the second filtering area CF2 to filter out the spectrum other than the green light and then it is provided to the display panel, so as to effectively improve the color saturation when the first display area A1 of the display image displays the green color. In fact, the first backlight unit R can also emit the first color light LR (i.e., the red light) and/or the third backlight unit B can also emit the third color light LB (i.e., the blue light), and there is no specific limitation.

Figure 8A:
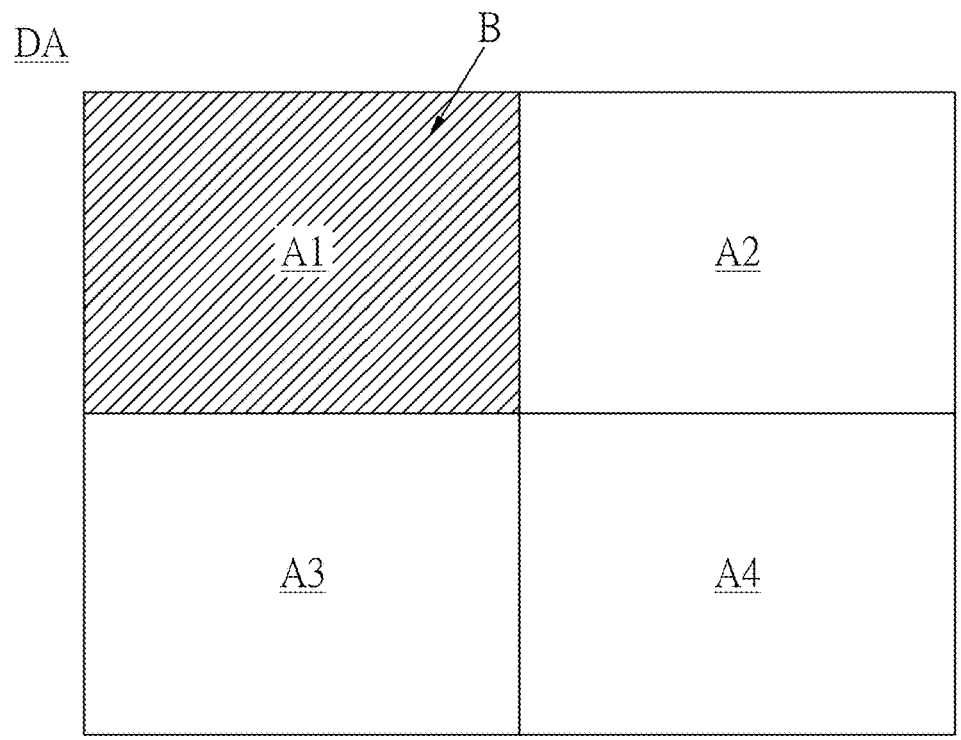
FIG. 8A illustrates a schematic diagram showing that a blue image is displayed in the first display area of the display image.
Figure 8B:
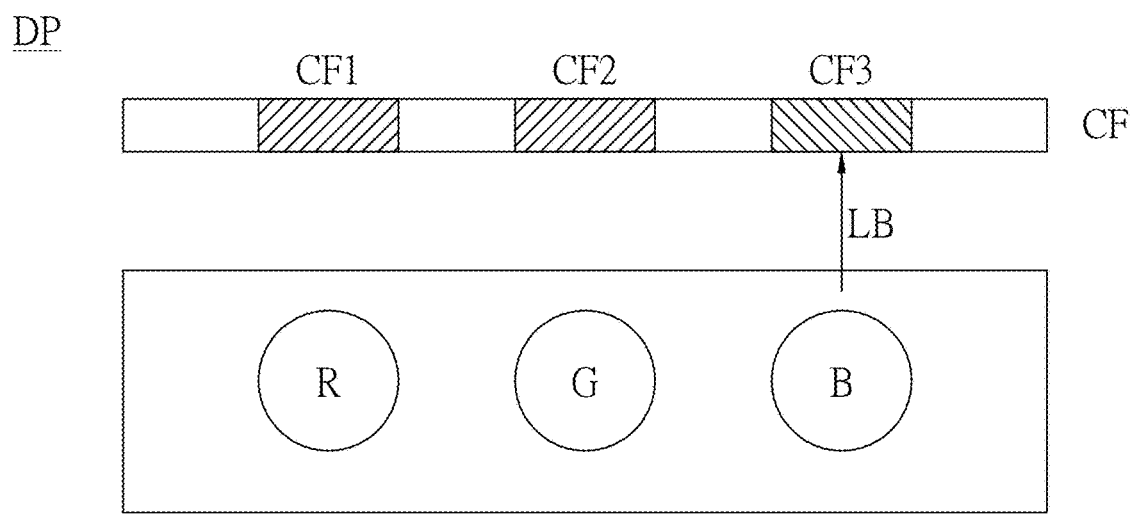
FIG. 8B illustrates a schematic diagram showing that only the third backlight unit of the display apparatus independently emits blue light.

In another embodiment, as shown in FIG. 8A and FIG. 8B, in the color mode, when the first display area A1 of the display image displays the blue color (B), only the third backlight unit B corresponding to the blue color independently emits the third color light LB (i.e., the blue light) to the third filtering area CF3 of the color filter CF (that is to say, the first backlight unit R corresponding to the red color and the second backlight unit G corresponding to the green color do not emit lights), and then the third color light LB (i.e., the blue light) passes through the third filtering area CF3 to filter out the spectrum other than the blue light and then it is provided to the display panel, so as to effectively improve the color saturation when the first display area A1 of the display image displays the blue color. In fact, the first backlight unit R can also emit the first color light LR (i.e., the red light) and/or the second backlight unit G can also emit the second color light LG (i.e., the green light), and there is no specific limitation.

In practical applications, when a first display image change occurs in the first display area A1 of the display image, the first backlight unit R, the second backlight unit G and the third backlight unit B can correspondingly adjust at least one of the first color light LR, the second color light LG and the third color light LB emitted by them according to a first dimming mode. Wherein, the first dimming mode can correspond to the first display image change and it can be used for adjusting the chromaticness of at least one of the first color light LR, the second color light LG and the third color light LB, but not limited to this.

For example, if the first display image change occurs in the first display area A1 is a change from the red image shown in FIG. 6A to the green image shown in FIG. 7A, the first backlight unit R, the second backlight unit G and the third backlight unit B can correspondingly adjust the chromaticness of the first color light LR, the second color light LG and the third color light LB according to the first dimming mode corresponding to the first display image change, for example, a change from that only the first backlight unit R independently emits the first color light LR (i.e., the red light) as shown in FIG. 6B to that only the second backlight unit G independently emits the second color light LG (i.e., the green light) shown in FIG. 7B, but not limited to this.

Similarly, if a second display image change occurs in the first display area A1 is a change from the blue image shown in FIG. 8A to the red image shown in FIG. 6A, the first backlight unit R, the second backlight unit G and the third backlight unit B can correspondingly adjust the chromaticness of the first color light LR, the second color light LG and the third color light LB according to a second dimming mode corresponding to the second display image change, for example, a change from that only the third backlight unit B independently emits the third color light LB (i.e., the blue light) as shown in FIG. 8B to that the first backlight unit R independently emits the first color light LR (i.e., the red light) shown in FIG. 6B, but not limited to this.

Figure 9A:
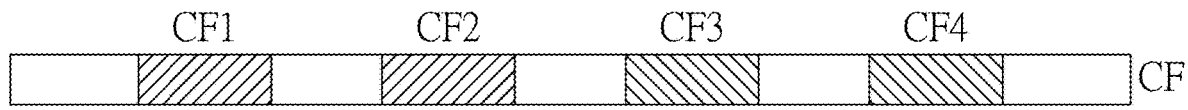
FIG. 9A illustrates a schematic diagram of a display apparatus including a color filter and a first backlight unit to a fourth backlight unit emitting lights independently in another embodiment of the invention.

Next, please refer to FIG. 9A. FIG. 9A shows a schematic diagram of the display apparatus including a color filter and a first backlight unit to a fourth backlight unit emitting lights independently in another embodiment of the invention.

As shown in FIG. 9A, the display apparatus DP includes a color filter CF, a first backlight unit R, a second backlight unit G, a third backlight unit B and a fourth backlight unit W. The first backlight unit R, the second backlight unit G, the third backlight unit B and the fourth backlight unit W are disposed relative to the color filter CF. The color filter CF includes a first filtering area CF1, a second filtering area CF2, a third filtering area CF3 and a fourth filtering area CF4 corresponding to the first backlight unit R, the second backlight unit G, the third backlight unit B and fourth backlight unit W respectively. The first backlight unit R, the second backlight unit G, the third backlight unit B and the fourth backlight unit W are independently controlled. In other words, the first backlight unit R, the second backlight unit G, the third backlight unit B and the fourth backlight unit W emit lights independently, and there is no correlation between them.

Figure 9B:
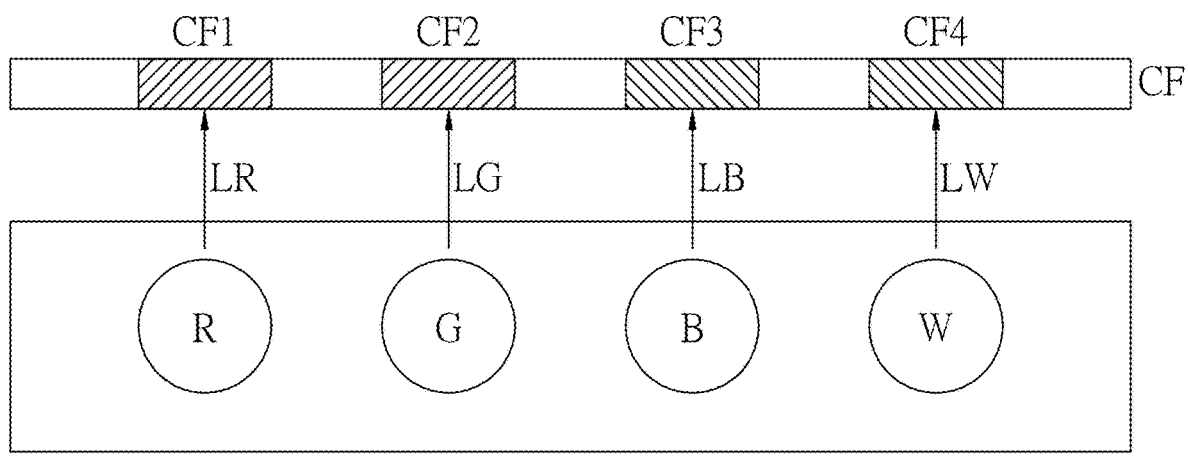
FIG. 9B illustrates a schematic diagram of the first backlight unit to the fourth backlight unit in the display apparatus emitting light simultaneously.

As shown in FIG. 9B, when the first backlight unit R, the second backlight unit G, the third backlight unit B and the fourth backlight unit W emit the first color light LR, the second color light LG, the third color light LB and the fourth color light LW to the first filtering area CF1, the second filtering area CF2, the third filtering area CF3 and the fourth filtering area CF4 of the color filter CF respectively, the first filtering area CF1, the second filtering area CF2, the third filtering area CF3 and the fourth filtering area CF4 will perform filtering on the first color light LR, the second color light LG, the third color light LB and the fourth color light LW respectively, so as to filter out the remaining unnecessary spectrum and then they are provided to the display panel, so that the display image displays a mixed light of the first color light LR, the second color light LG, the third color light LB and the fourth color light LW.

For example, the first backlight unit R, the second backlight unit G, the third backlight unit B and the fourth backlight unit W can be a red backlight unit, a green backlight unit, a blue backlight unit and a white backlight unit respectively. The first color light LR, the second color light LG, the third color light LB and the fourth color light LW emitted by the first backlight unit R, the second backlight unit G, the third backlight unit B and the fourth backlight unit W are red light, green light, blue light and white light respectively, and the first filtering area CF1, the second filtering area CF2, the third filtering area CF3 and fourth filtering area CF4 of the color filter CF are a red light filtering area, a green light filtering area, a blue light filtering area and a white light filtering area used to perform filtering on the first color light LR (i.e., the red light), the second color light LG (i.e., the green light), the third color light LB (i.e., the blue light) and the fourth color light LW (i.e., the white light) respectively, but not limited to this.

It should be noted that, since the luminous efficiency of the first backlight unit R corresponding to the red color and the second backlight unit G corresponding to the green color is generally poor, the display apparatus DP of this embodiment can further add a fourth backlight unit emitting white light. The fourth backlight unit W can emit different intensities of the fourth color light LW (i.e., the white light) according to different display modes or display image changes to mix with the first color light LR (i.e., the red light), the second color light LG (i.e., the green light) and the third color light LB (i.e., the blue light) emitted by the first backlight unit R, the second backlight unit G and the third backlight unit B.

For example, in the brightness mode, in order to increase the brightness of the display image, the fourth backlight unit W can increase the intensity of the fourth color light LW (i.e., the white light) emitted by it, but not limited to this; in the color mode, in order to increase the color saturation of the display image, the fourth backlight unit W can reduce the intensity of the fourth color light LW (i.e., the white light) emitted by the fourth backlight unit W, but not limited to this.

When the first display image change occurs in the first display area A1, the fourth backlight unit W can selectively adjust the fourth color light LW (i.e., the white light) emitted by it according to the first dimming mode corresponding to the first display image change, but not limited to this.

Figures 10A, 10B:
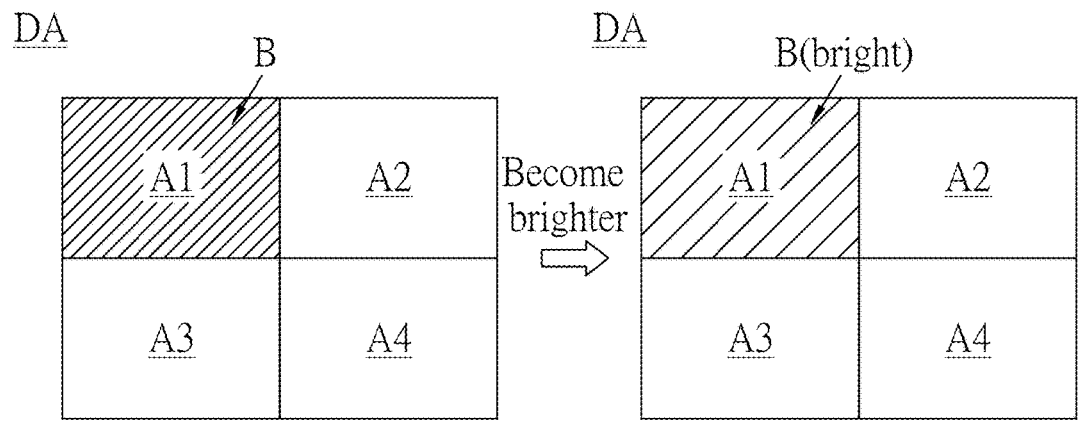
FIG. 10A and FIG. 10B illustrate schematic diagrams showing that the blue image displayed in the first display area becomes brighter.
Figure 10C:
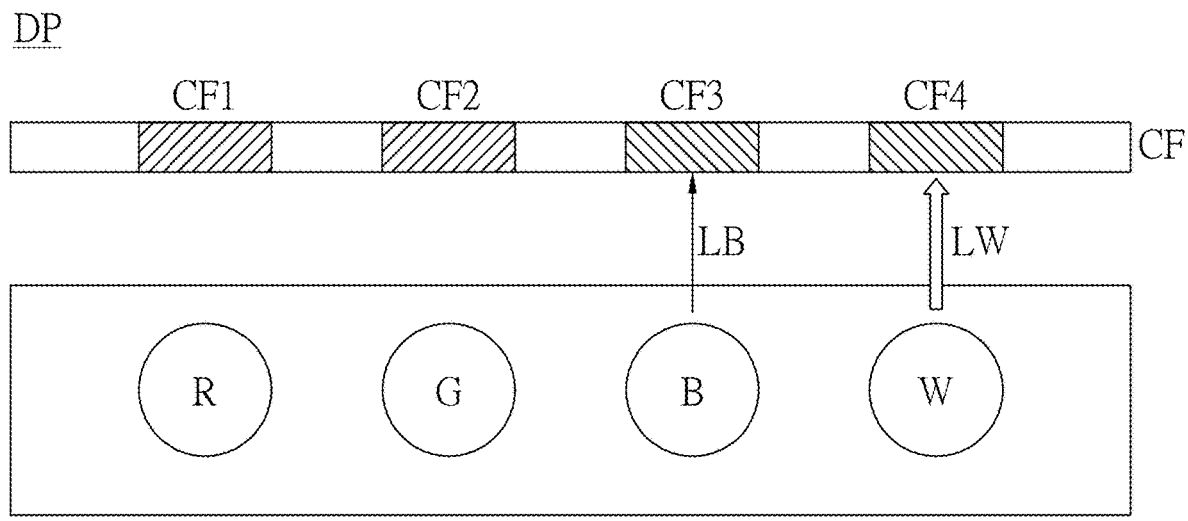
FIG. 10C illustrates a schematic diagram of increasing the intensity of white light emitted by the fourth backlight unit.

In one embodiment, when the first display image change is to increase the brightness of the display image, for example, the blue (B) image displayed in the first display area A1 becomes brighter (as shown in FIG. 10A to FIG. 10B), the fourth backlight unit W can increase the intensity of the white light LW emitted by the fourth backlight unit W according to the first dimming mode corresponding to the first display image change (as shown by the thickened arrow corresponding to the white light LW in FIG. 10C), but not limited to this. In addition, the display apparatus DP can simultaneously reduce the chromaticness of at least one of the first color light LR (i.e., the red light), the second color light LG (i.e., the green light) and the third color light LB (i.e., the blue light) according to the first dimming mode, but not limited to this.

Figures 11A, 11B:
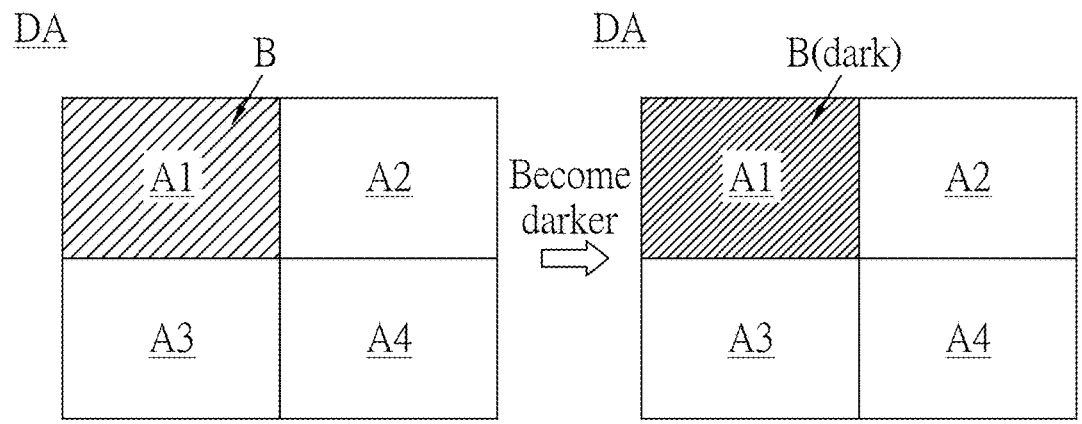
FIG. 11A and FIG. 11B illustrate schematic diagrams showing that the blue image displayed in the first display area becomes darker.
Figure 11C:
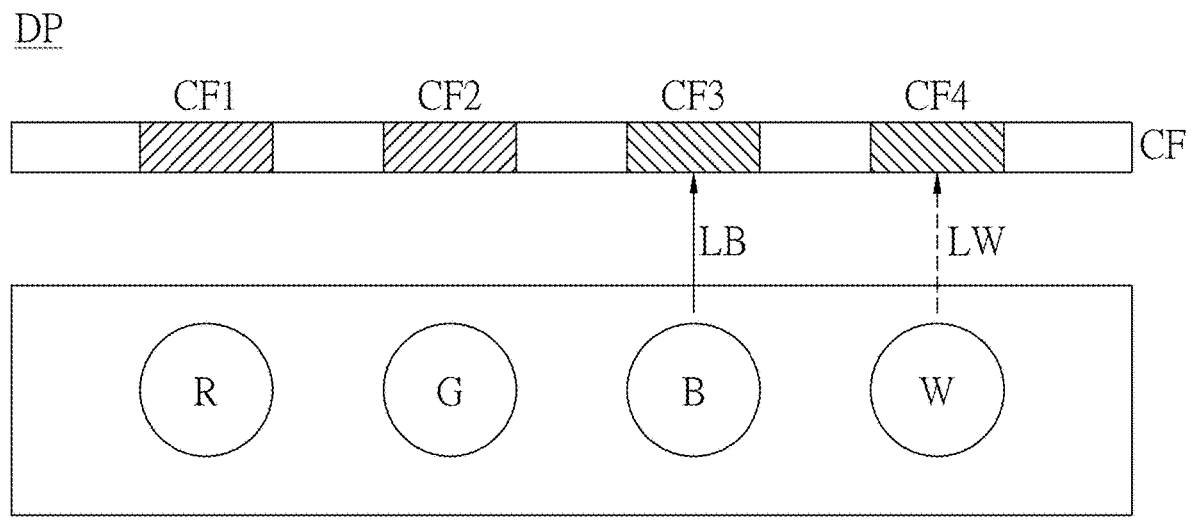
FIG. 11C illustrates a schematic diagram of reducing the intensity of white light emitted by the fourth backlight unit.

In another embodiment, when the first display image change is to reduce the brightness of the display image, for example, the blue (B) image displayed in the first display area A1 becomes darker (as shown in FIG. 11A to FIG. 11B). At this time, the fourth backlight unit W can reduce the intensity of the white light LW emitted by the fourth backlight unit W according to the first dimming mode corresponding to the first display image change (as shown by the arrow corresponding to the white light LW turned into a broken line in FIG. 11C), but not limited to this. In addition, the display apparatus DP can simultaneously increase the chromaticness of at least one of the first color light LR (i.e., the red light), the second color light LG (i.e., the green light) and the third color light LB (i.e., the blue light) according to the first dimming mode to increase the color saturation of the display image, but not limited to this.

It should be noted that although the above-mentioned embodiment takes the first display area A1 of the display image DA as an example, the description is not limited to this. The other display areas of the display image DA (for example, the second display area A2 to the fourth display area A4) display images of other colors (for example, the red color or the green color) can also be deduced by analogy, which will not be described here.

Next, please refer to FIG. 12A and FIG. 12B. Comparing FIG. 12A and FIG. 12B, it can be seen that a display image with poor color saturation (as shown in FIG. 12A) can effectively increase the color saturation of the display image (as shown in FIG. 12B) after the dimming described above.

Figure 13:
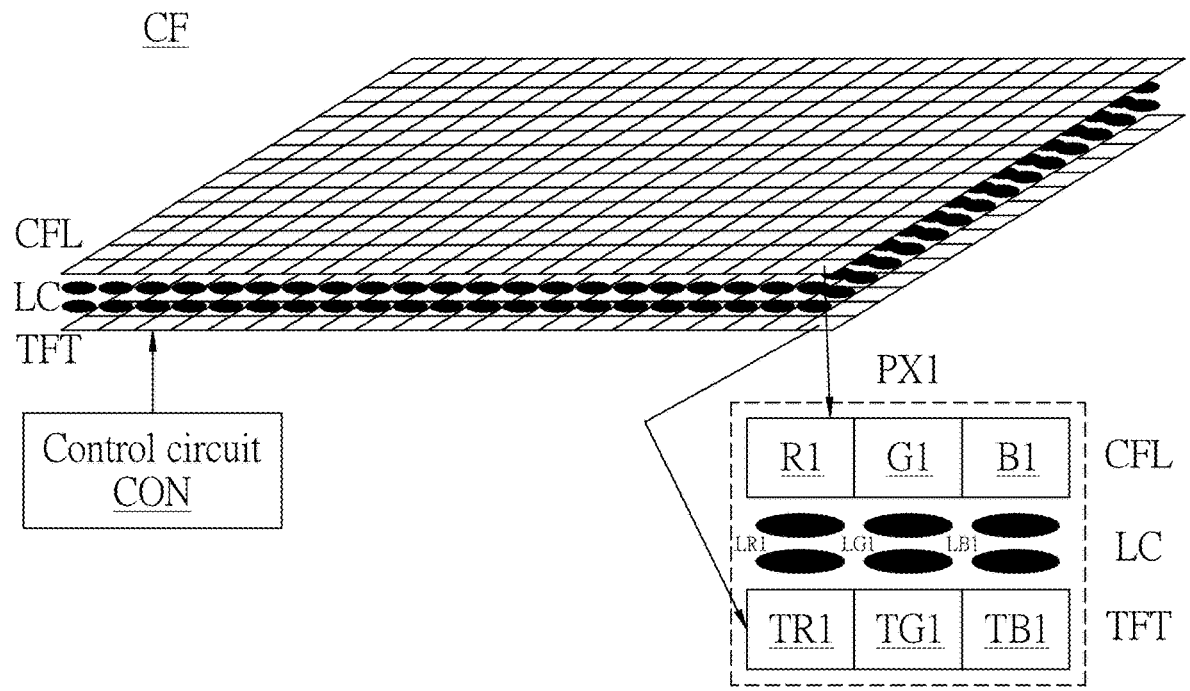
FIG. 13 illustrates a schematic diagram of the color filter including a thin-film transistor layer, a liquid crystal layer and a color filtering layer, and the control circuit is electrically connected to the thin-film transistor layer in the invention.

Please refer to FIG. 13. In one embodiment, the color filter CF in the display apparatus DP of the invention can include a thin-film transistor layer TFT, a liquid crystal layer LC and a color filter layer CFL. A control circuit CON in the display apparatus DP is electrically connected to the thin-film transistor layer TFT for controlling rotation angles of liquid crystals in the liquid crystal layer LC.

Taking the first pixel PX1 in FIG. 13 as an example, the thin-film transistor layer TFT includes a first thin-film transistor TR1, a second thin-film transistor TG1 and a third thin-film transistor TB1. The liquid crystal layer LC includes a first liquid crystal area LR1, a second liquid crystal area LG1 and a third liquid crystal area LB1. The color filter layer CFL includes a first filtering area R1, a second filtering area G1 and a third filtering area B1. Among them, the first thin-film transistor TR1 corresponds to the first liquid crystal area LR1 and the first filtering area R1; the second thin-film transistor TG1 corresponds to the second liquid crystal area LG1 and the second filtering area G1; the third thin-film transistor TB1 corresponding to the third liquid crystal area LB1 and the third filtering area B1.

The control circuit CON can control the rotation angle of the first liquid crystal area LR1 through the first thin-film transistor TR1, so as to adjust the intensity of the first color light LR that can enter the first filtering area R1. Similarly, the control circuit CON can control the rotation angle of the second liquid crystal area LG1 through the second thin-film transistor TG1, so as to adjust the intensity of the second color light LG that can enter the second filtering area G1. The control circuit CON can also control the rotation angle of the third liquid crystal area LB1 through the third thin-film transistor TB1, so as to adjust the intensity of the third color light LB that can enter the third filtering area B1. In fact, the rotation angles of the first liquid crystal area LR1, the second liquid crystal area LG1 and the third liquid crystal area LB1 are adjusted according to the condition of the display image of the display apparatus to determine the color of the display image.

In one embodiment, the sizes of the first backlight unit R, the second backlight unit G and the third backlight unit B can be larger than the sizes of the first filtering area R1, the second filtering area G1 and the third filtering area B1 in the first pixel PX1; that is to say, the sizes of the first backlight unit R, the second backlight unit G and the third backlight unit B are not pixel levels, but not limited to this.

In another embodiment, the sizes of the first backlight unit R, the second backlight unit G and the third backlight unit B can also be equal to the sizes of the first filtering area R1, the second filtering area G1 and the third filtering area B1 in the first pixel PX1. The size of the area and the third filtering area B1; that is to say, the sizes of the first backlight unit R, the second backlight unit G and the third backlight unit B can be pixel levels, but not limited to this.

Figure 14:
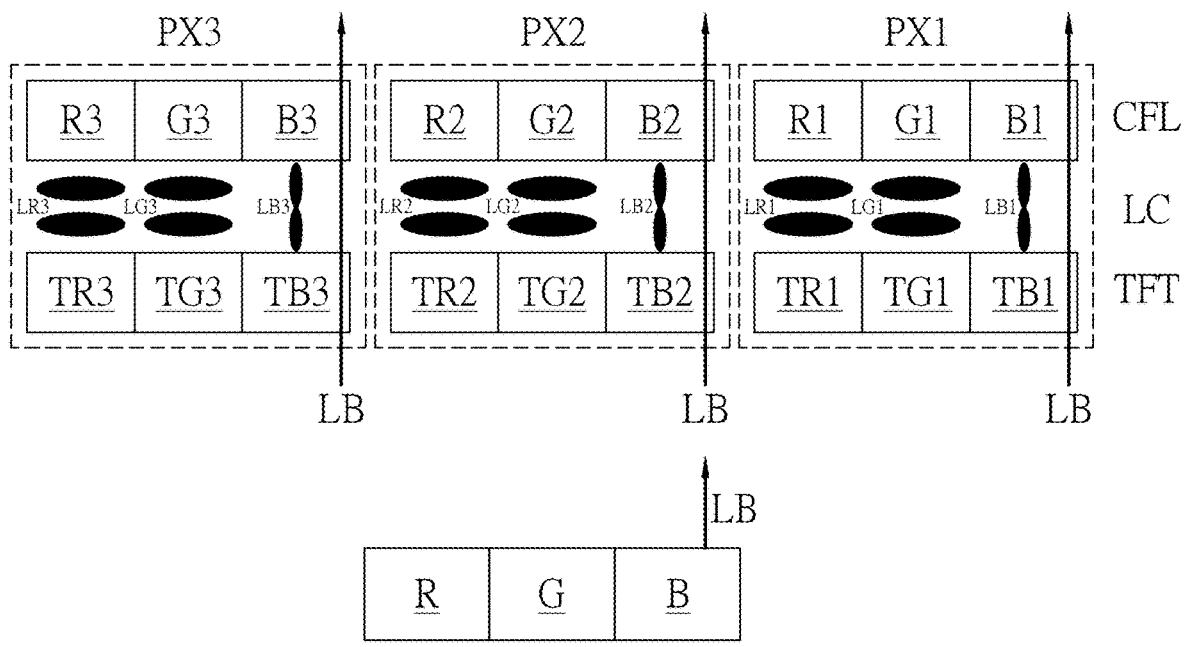
FIG. 14 illustrates a schematic diagram showing that in the color mode, when the display image is biased to the blue color, only the third backlight unit emits the third color light and it corresponds to the largest liquid crystal rotation angle.

Next, please refer to FIG. 14. As shown in FIG. 14, the sizes of the first backlight unit R, the second backlight unit G and the third backlight unit B2 are not pixel levels, and the first backlight unit R, the second backlight unit G and the third backlight unit B2 correspond to the first pixel PX1 to the third pixel PX3. In the color mode, when the display image of the display apparatus DP is biased to the blue color, only the third backlight unit B can emit the third color light LB (i.e., the blue light) to the first pixel PX1 to the third pixel PX3, and the first backlight unit R and the second backlight unit G do not emit lights. The control circuit CON can control the rotation angles of the third liquid crystal areas LB1~LB3 in the first pixel PX1 to the third pixel PX3 to be the largest through the third thin-film transistors TB1~TB3 in the first pixel PX1 to the third pixel PX3, so that the third color light LB (i.e., the blue light) can enter the third filtering areas B1 to B3 of the first pixel PX1 to the third pixel PX3 to be filtered respectively.

Figure 15:
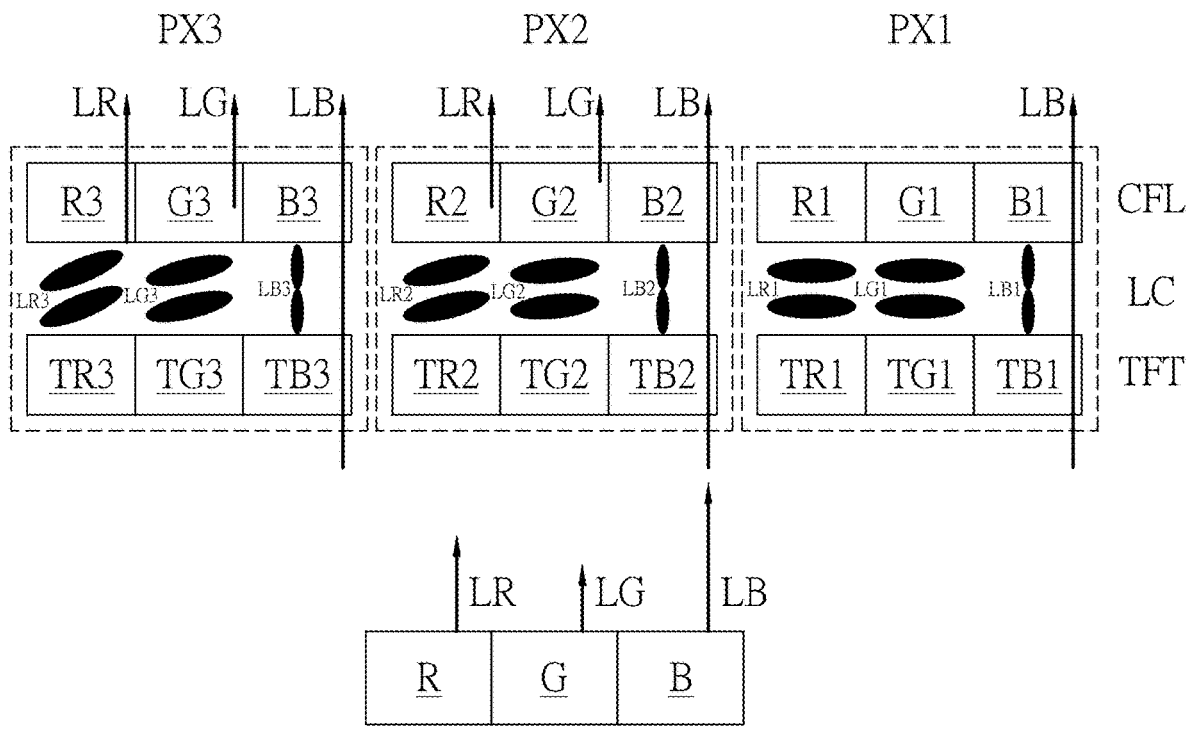
FIG. 15 illustrates a schematic diagram showing that the third backlight unit emits the strongest third color light and it corresponds to the largest liquid crystal rotation angle when the display image is biased to the blue color in the color mode.

In another embodiment, as shown in FIG. 15, in the color mode, when the display image of the display apparatus DP is biased to the blue color, the first backlight unit R, the second backlight unit G and the third backlight unit B are emit a first color light LR, a second color light LG and a third color light LB respectively, wherein the third color light LB (i.e., the blue light) has a third intensity greater than a first intensity of the first color light LR and the second intensity of the second color light LG; that is to say, compared with the first color light LR emitted by the first backlight unit R and the second color light LG emitted by the second backlight unit G, the third color light LB (i.e., the blue light) emitted by the third backlight unit B is the strongest. Since the display image of the display apparatus DP is biased to the blue color, the control circuit CON can control the rotation angles of the third liquid crystal areas LB1~LB3 in the first pixel PX1 to the third pixel PX3 to be the largest through the third thin-film transistors TB1 to TB3 in the first pixel PX1 to the third pixel PX3 respectively, so that the third color light LB (i.e., the blue light) can enter the third filtering areas B1~B3 of the first pixel PX1 to the third pixel PX3 to be filtered respectively.

It should be noted that for the first pixel PX1 in FIG. 15, the control circuit CON can adjust the first thin-film transistor TR1 and the second thin-film transistor TG1 in the first pixel PX1 respectively. The rotation angles of the first liquid crystal area LR1 and the second liquid crystal area LG1 in the pixel PX1 are the smallest, so that the first color light LR emitted by the first backlight unit R and the second color light LG emitted by the second backlight unit G fail to enter the first filtering area R1 and the second filtering area G1 in the first pixel PX1 to be filtered respectively, so that the color of the display image of the display apparatus DP is pure blue without red or green components.

Regarding the second pixel PX2 in FIG. 15, the control circuit CON can adjust the rotation angles of the first liquid crystal area LR2 and the second liquid crystal area LG2 in the second pixel PX2 through the first thin-film transistor TR2 and the second thin-film transistor TG2 in the second pixel PX2, so that a part of the first color light LR emitted by the first backlight unit R and the second color light LG emitted by the second backlight unit G can enter the first filtering area R2 and the second filtering area G2 in the pixel PX2 to be filtered respectively, so that the color of the display image of the display apparatus DP is biased to the blue color but still has red and green components, and the second intensity of the second color light LG can be greater than the first intensity of the first color light LR, or the first intensity of the first color light LR is greater than the second intensity of the second color light LG, depending on the condition of the display image.

Similarly, for the third pixel PX3 in FIG. 15, the control circuit CON can adjust the rotation angles of the first liquid crystal area LR3 and the second liquid crystal area LG3 in the third pixel PX3 through the first thin-film transistor TR3 and the second thin-film transistor TG3 in the third pixel PX3, so that a part of the first color light LR emitted by the first backlight unit R and the second color light LG emitted by the second backlight unit G can enter the first filtering area R3 and the second filtering area G3 in the third pixel PX3 to be filtered respectively, so that the color of the display image of the display apparatus DP is biased to the blue color but still has red and green components, and the second intensity of the second color light LG can be greater than the first intensity of the first color light LR, or the first intensity of the first color light LR can be greater than the second intensity of the second color light LG, depending on the condition of the display image.

After comparing the second pixel PX2 with the third pixel PX3 in FIG. 15, it can be found that since the rotation angles of the first liquid crystal area LR2 and the second liquid crystal area LG2 in the second pixel PX2 are different from the rotation angles of the first liquid crystal area LR3 and the second liquid crystal area LG3 in the third pixel PX3, the first intensity of the first color light LR and the second intensity of the second color light LG in the second pixel PX2 are also different from the first intensity of the first color light LR and the second intensity of the second color light LG in the third pixel PX3. In this embodiment, the first intensity of the first color light LR and the second intensity of the second color light LG in the second pixel PX2 are smaller than the first intensity of the first color light LR and the second intensity of the second color light LG in the third pixel PX3, but not limited to this.

Figure 16:
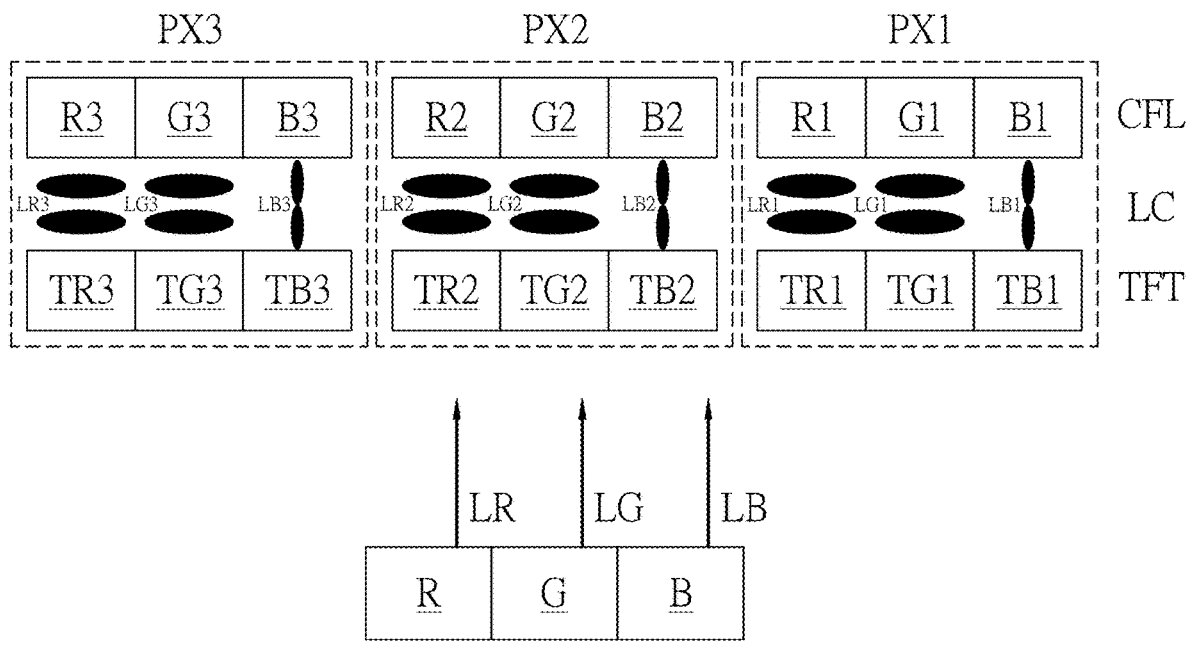
FIG. 16 illustrates a schematic diagram showing that in the brightness mode, the first color light, the second color light and the third color light can be mixed into white light before entering the color filter, and the composition of the red light, the green light and the blue light in the first pixel to the third pixel is determined by the liquid crystal rotation angle.

Next, please refer to FIG. 16. As shown in FIG. 16, in the brightness mode, the first color light LR emitted by the first backlight unit R, the second color light LG emitted by the second backlight unit G and the third color light LB emitted by the third backlight unit B can be mixed into white light before entering the color filter CF, and the composition of the first color light LR (i.e., the red light), the second color light LG (i.e., the green light) and the third color light LB (i.e., the blue light) in the first pixel PX1 to the third pixel PX3 is determined by the rotation angles of the first liquid crystal areas LR1~LR3, the second liquid crystal areas LG1~LG3 and the third liquid crystal areas LB1~LB3 in the first pixel PX1 to the third pixel PX3, so it can be adjusted according to the condition of the display image.

Compared to the prior art, the display apparatus of the invention has following advantages/effects:

(1) the display apparatus of the invention can use red, green and blue light-emitting diode (LED) backlight units to emit lights independently and cooperate with local dimming to improve color saturation of its display image;

(2) since the luminous efficiency of red and green LED backlight units is generally poor, the display apparatus of the invention can also add a LED backlight unit emitting white light to mix with red, green and blue lights, which can increase the intensity of white light in a brightness mode to enhance the brightness of its display image, and reduce the intensity of white light in a color mode to increase the color saturation of its display image; and (3) in the color mode, when the color of the display image is biased to the blue color, the display apparatus of the invention will reduce the luminous intensity of the red LED backlight unit and/or the green LED backlight unit; when the color of the display image is biased to the green color, the display apparatus of the invention will reduce the luminous intensity of the red LED backlight unit and/or the blue LED backlight unit to increase the color saturation of its display image.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A display apparatus, comprising:
a color filter;
a first backlight unit, a second backlight unit and a third backlight unit, disposed relative to the color filter, configured to independently emit a first color light, a second color light and a third color light to the color filter respectively;
wherein in a brightness mode, the first color light has a first intensity, the second color light has a second intensity and the third color light has a third intensity; in a color mode, when a display image of the display apparatus is biased to a third color corresponding to the third color light, the display apparatus reduces at least one of the first intensity and the second intensity: the color filter comprises a first filtering area, a second filtering area and a third filtering area corresponding to the first backlight unit, the second backlight unit and the third backlight unit respectively and the first filtering area, the second filtering area and the third filtering area are configured to perform filtering on the first color light, the second color light and the third color light respectively.

2. The display apparatus of claim 1, wherein the third color light is blue light, and the first color light and the second color light are red light and green light respectively; in the brightness mode, the first color light, the second color light and the third color light are mixed into white light before entering the color filter.

3. The display apparatus of claim 1, wherein in the color mode, when the display image is biased to a second color corresponding to the second color light, the display apparatus reduces at least one of the first intensity and the third intensity.

4. The display apparatus of claim 3, wherein the first color light, the second color light and the third color light are red light, green light and blue light respectively; in the brightness mode, the first color light, the second color light and the third color light are mixed into white light before entering the color filter.

5. The display apparatus of claim 1, wherein a first display area and a second display area of the display image correspond to the color mode and the brightness mode respectively.

6. The display apparatus of claim 5, further comprising:
a fourth backlight unit, disposed relative to the color filter and independently controlled, configured to emit a fourth color light to make the second display area to display a mixed light of the first color light, the second color light, the third color light and the fourth color light.

7. The display apparatus of claim 5, wherein when a first display image change occurs in the first display area, the first backlight unit, the second backlight unit and the third backlight unit correspondingly adjust at least one of the first color light, the second color light and the third color light emitted by the first backlight unit, the second backlight unit and the third backlight unit according to a first dimming mode.

8. The display apparatus of claim 5, wherein when a second display image change occurs in the second display area, the first backlight unit, the second backlight unit and the third backlight unit correspondingly adjust at least one of the first color light, the second color light and the third color light emitted by the first backlight unit, the second backlight unit and the third backlight unit according to a second dimming mode.

9. The display apparatus of claim 1, wherein the color filter comprises a color filter layer, the color filter layer comprises the first filtering area, the second filtering area and the third filtering area, and sizes of the first backlight unit, the second backlight unit and the third backlight unit are larger than sizes of the first filtering area, the second filtering area and the third filtering area.

10. The display apparatus of claim 1, wherein the color filter comprises a liquid crystal layer and a color filtering layer, the liquid crystal layer comprises a first liquid crystal area, a second liquid crystal area and a third liquid crystal area, and the color filtering layer comprises the first filtering area, the second filtering area and the third filtering area corresponding to the first liquid crystal area, the second liquid crystal area and the third liquid crystal respectively; when the display image is biased to the third color, the third intensity is greater than the first intensity and the second intensity, and a rotating angle of the third liquid crystal area is greater than that of the first liquid crystal area and that of the second liquid crystal area; the rotation angles of the first liquid crystal area, the second liquid crystal area and the third liquid crystal area are adjusted according to a condition of the display image to determine the color of the display image.

11. A display apparatus, comprising:
a color filter, disposed corresponding to a display area of the display apparatus;
a first backlight unit, a second backlight unit and a third backlight unit, disposed corresponding to the color filter, configured to independently emit a first color light, a second color light and a third color light to the color filter respectively;
wherein when a first display image change occurs in the display area, the first backlight unit, the second backlight unit and the third backlight unit correspondingly adjust at least one of the first color light, the second color light and the third color light emitted by the first backlight unit, the second backlight unit and the third backlight unit according to a first dimming mode; when the first display image change is to increase brightness of the display image, the first dimming mode also reduces chromaticness of at least one of the first color light, the second color light and the third color light; when the first display image change is to reduce brightness of the display image, the first dimming mode also increases chromaticness of at least one of the first color light, the second color light and the third color light the color filter comprises a first filtering area, a second filtering area and a third filtering area corresponding to the first backlight unit, the second backlight unit and the third backlight unit respectively and the first filtering area, the second filtering area and the third filtering area are used to perform filtering on the first color light, the second color light and the third color light respectively.

12. The display apparatus of claim 11, wherein the first dimming mode corresponds to the first display image change and is used for adjusting chromaticness of at least one of the first color light, the second color light and the third color light.

13. The display apparatus of claim 11, wherein when a second display image change occurs in the display area, the first backlight unit, the second backlight unit and the third backlight unit correspondingly adjust at least one of the first color light, the second color light and the third color light emitted by the first backlight unit, the second backlight unit and the third backlight unit according to a second dimming mode.

14. The display apparatus of claim 13, wherein the second dimming mode corresponds to the second display image change and is used for adjusting chromaticness of at least one of the first color light, the second color light and the third color light.

15. The display apparatus of claim 11, further comprising:
a fourth backlight unit, disposed relative to the color filter and independently controlled, configured to emit a fourth color light;
wherein, when the first display image change occurs in the display area, the fourth backlight unit selectively adjusts the fourth color light emitted by the fourth backlight unit according to the first dimming mode.

16. The display apparatus of claim 15, wherein the first dimming mode corresponds to the first display image change and is used for adjusting brightness of the fourth color light.

\* \* \* \* \*